United States Patent
Nakamura et al.

(10) Patent No.: US 7,262,931 B2
(45) Date of Patent: Aug. 28, 2007

(54) DISK DRIVE USING MAGNETIC DISK MEDIUM OF DISCRETE TRACK RECORDING

(75) Inventors: Hiroaki Nakamura, Kawasaki (JP); Makoto Asakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 282 days.

(21) Appl. No.: 11/147,463

(22) Filed: Jun. 8, 2005

(65) Prior Publication Data

US 2006/0012913 A1 Jan. 19, 2006

(30) Foreign Application Priority Data

Jul. 16, 2004 (JP) ............... 2004-210454

(51) Int. Cl.
*G11B 5/596* (2006.01)
(52) U.S. Cl. ............... 360/77.02; 360/78.04; 360/48
(58) Field of Classification Search ........... 360/77.02, 360/78.04, 48, 135, 51; 369/94, 47.1
See application file for complete search history.

(56) References Cited

U.S. PATENT DOCUMENTS

| | | | |
|---|---|---|---|
| 4,912,585 A | 3/1990 | Belser et al. | |
| 5,138,511 A * | 8/1992 | Hoshimi et al. | 360/135 |
| 5,898,553 A | 4/1999 | Oyanagi et al. | |
| 6,014,296 A * | 1/2000 | Ichihara et al. | 360/135 |
| 6,139,936 A | 10/2000 | Weiss | |
| 6,345,021 B1 * | 2/2002 | Belser et al. | 369/47.1 |
| 6,420,058 B1 | 7/2002 | Haratani et al. | |
| 6,754,017 B2 * | 6/2004 | Rettner et al. | 360/51 |
| 6,826,140 B2 * | 11/2004 | Brommer et al. | 369/94 |
| 2002/0089786 A1 | 7/2002 | Takino | |

FOREIGN PATENT DOCUMENTS

| | | |
|---|---|---|
| JP | 07-065363 | 3/1995 |
| JP | 08-293110 A | 11/1996 |
| JP | 2002-516450 A | 6/2002 |

OTHER PUBLICATIONS

Chinese Office Action dated Jan. 12, 2007 for Appln. No. 200510076040.5.
Australian Search Report dated Mar. 7, 2006 for Singapore Appln. No. 200503182-8.

* cited by examiner

*Primary Examiner*—Fred F. Tzeng
(74) *Attorney, Agent, or Firm*—Pillsbury Winthrop Shaw Pittman, LLP

(57) ABSTRACT

A magnetic disk medium of a discrete track recording (DTR) structure and a disk drive using the magnetic disk medium are disclosed. The magnetic disk medium of the DTR structure has positional-error detection servo patterns in a servo region, the positional-error detection servo patterns being formed of null servo patterns. This enables magnetic regions included in the servo region to occupy substantially 50% of the area of the servo region.

15 Claims, 4 Drawing Sheets

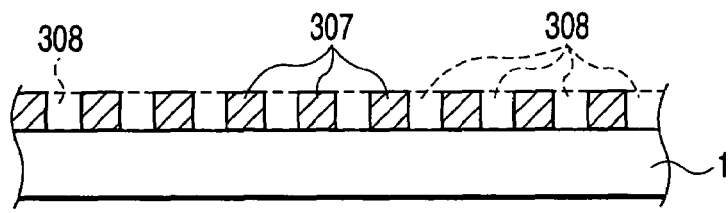
FIG. 2
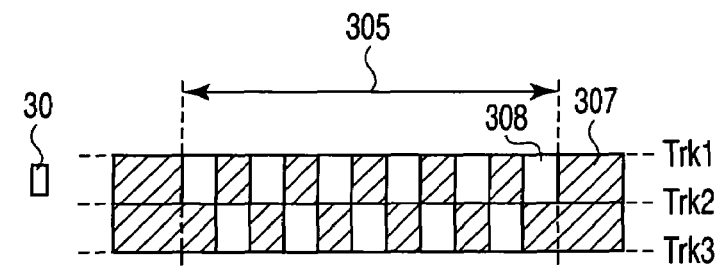
FIG. 3A
FIG. 3B
FIG. 3C
Between Trk 1 and Trk 2
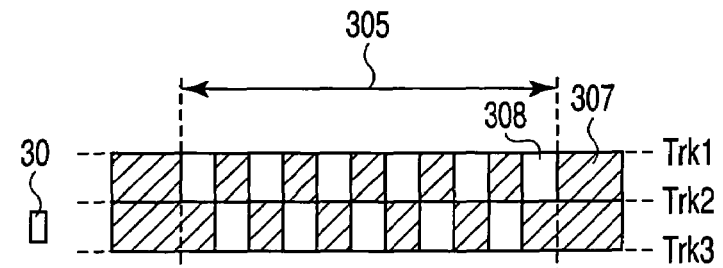
FIG. 4A
FIG. 4B
FIG. 4C
Between Trk 2 and Trk 3

FIG. 5B  600 Reproduction signal

FIG. 5C  601 Differential signal

At the center of Trk 2

DISK DRIVE USING MAGNETIC DISK MEDIUM OF DISCRETE TRACK RECORDING

CROSS-REFERENCE TO RELATED APPLICATIONS

This application is based upon and claims the benefit of priority from prior Japanese Patent Application No. 2004-210454, filed Jul. 16, 2004, the entire contents of which are incorporated herein by reference.

BACKGROUND OF THE INVENTION

1. Field of the Invention

The present invention relates to a disk drive, and more particularly to a disk drive utilizing a magnetic disk medium of a DTR structure.

2. Description of the Related Art

Attention has recently been paid to a magnetic disk medium (hereinafter referred to simply as "the disk medium") as a patterned medium of a discrete track recording (DTR).

The disk medium of the DTR structure comprises a first surface section effective as a magnetic recording section, and a second surface section ineffective as the magnetic recording section (see, for example, Jpn. Pat. Apple. KOKAI Publication No. 8-293110). The first surface section is a projected magnetic region on which a magnetic film is provided. The second surface section is a non-magnetic region or depressed magnetic-recording-incapable region. Namely, the second section, which is a depressed section, is configured as substantially a non-magnetic region even if a magnetic film is provided thereon.

In this type of disk medium, servo regions with servo data recorded therein can be embedded in the surface of the medium, without using a standard servo track writer.

The servo data contains, as well as sector address data and track address data, servo pattern data for detecting a positional error in a track (this may hereinafter be referred to as error detection servo pattern). The error detection servo pattern includes a servo pattern called a null servo pattern, as well as a burst servo pattern (see, for example, PCT National Publication No. 2002-516450).

The null servo pattern enables the formatting efficiency of each sector on a disk medium to be improved, and enables the total area of the servo regions on the medium to be reduced. The null servo pattern contains a synchronization region and a positional error region, and can acquire, using an asynchronous digital decoder, a positional error signal without being synchronized with a read signal.

The null servo pattern is written on a disk medium by a servo track writer. On the other hand, in disks of the DTR structure, conventional burst servo patterns are generally embedded.

In disks of the DTR structure, however, it is not easy to embed servo patterns in a disk by a transfer forming method, since the ratio of the entire area of the data regions to that of the servo patterns is high. More specifically, it is difficult to apply uniform pressure during a transfer forming process and hence to form uniform servo patterns. As a result, the accuracy of head positioning using the resultant servo patterns may well be degraded.

BRIEF SUMMARY OF THE INVENTION

In accordance with an aspect of the invention, there are provided a disk medium of a DTR structure that employs uniform servo patterns, and a disk drive using the disk medium.

The disk medium of the DTR structure according to the aspect of the invention includes circumferentially extending tracks which includes a servo region with servo data recorded therein and a data region. The data region includes non-magnetic guard bands which isolate each pair of adjacent ones of the tracks. The servo region includes a servo pattern which is formed of first regions effective as magnetic regions, and second regions ineffective as magnetic regions. The servo pattern includes a null servo pattern used to detect a positional error in each track.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a view useful in explaining the structure of a servo region employed in the embodiment of the invention;

FIGS. 3A to 3C are views useful in explaining a reproduction signal waveform read from the servo region;

FIGS. 4A to 4C are views useful in explaining another reproduction signal waveform read from the servo region;

FIGS. 5A to 5C are views useful in explaining yet another reproduction signal waveform read from the servo region;

DETAILED DESCRIPTION OF THE INVENTION

Referring to the accompanying drawings, an embodiment of the invention will be described.

(The Structure of a Disk Medium)

Figure 1:
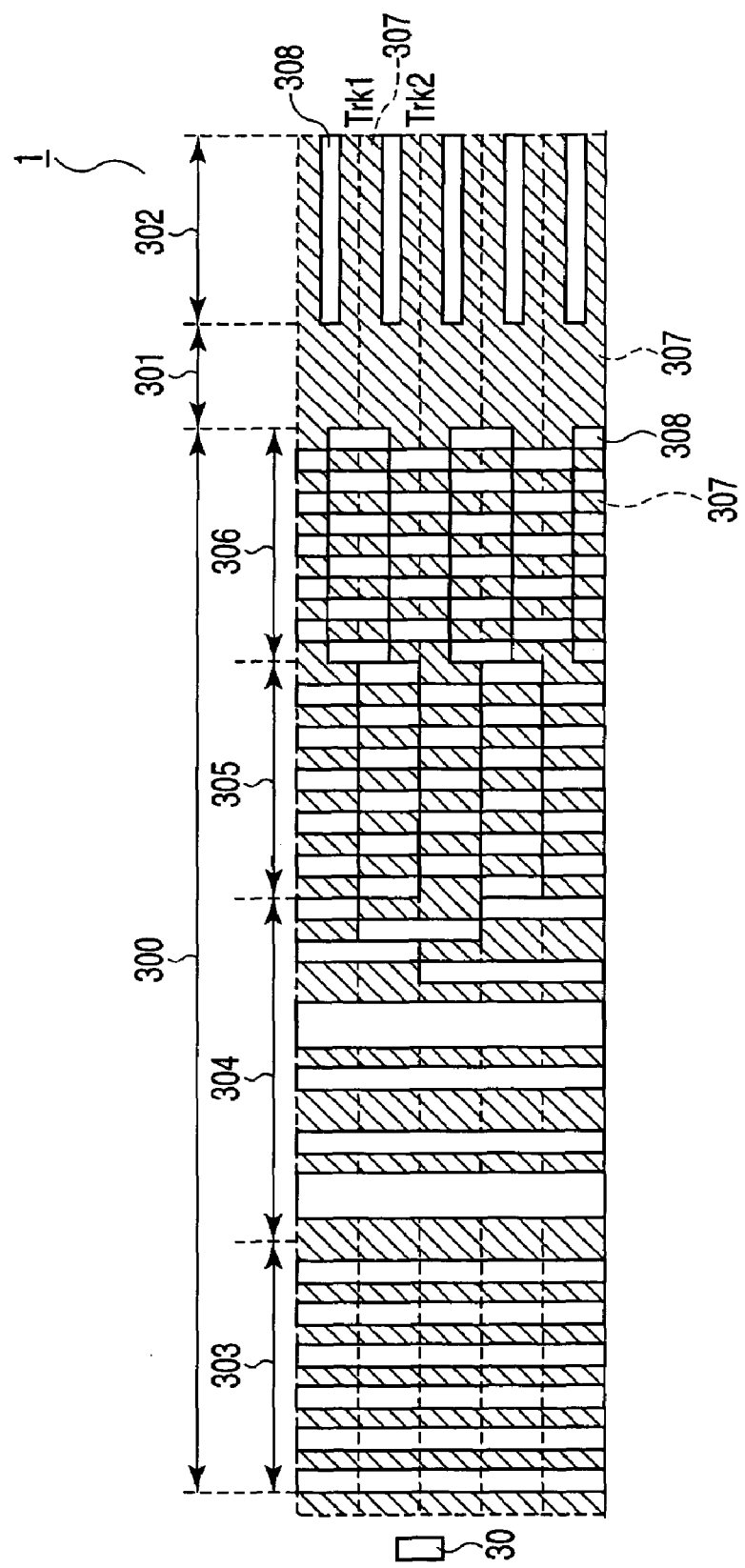
FIG. 1 is a view useful in explaining the structure and format of a disk medium according to an embodiment of the invention.

FIG. 1 is a view useful in explaining the structure and format of a disk medium 1 according to the embodiment.

As shown in FIG. 1, the disk medium 1 of the embodiment has a discrete track recording (DTR) structure in which a data region 302 includes data tracks formed of magnetic regions 307 magnetically isolated from each other by gird bands that are formed of non-magnetic regions 308. The thus-constructed disk medium 1 is also called a discrete patterned medium. In each track (Trk1, Trk2) of the disk medium 1, the ratio of each magnetic region 307 to each non-magnetic region 308 is 2:1.

In each one-turn track, the disk medium 1 is divided into, for example, about 100 sectors. A servo region 300 with servo data beforehand recorded (embedded) is provided as the leading region of each sector. As shown in FIG. 2, the servo data includes a positional-error detection servo pattern that is formed of magnetic regions 307 and non-magnetic regions 308 each corresponding to one bit.

Each magnetic region 307 is effective as a magnetic recording region, and is a projection formed of a magnetic film. In contrast, each non-magnetic region 308 is formed of a magnetic film, but is a depression relative to each magnetic region 307 and is ineffective as a magnetic recording region. However, if each non-magnetic region 308 is formed of a non-magnetic film, it may not always be a depression and be a region in which a non-magnetic material is embedded.

The servo region 300 basically contains, like standard servo data, a synchronous pattern section 303, an address (sector and track) code section 304, and positional-error detection servo patterns 305 and 306 for specifying the head position in each track.

Each of the synchronous pattern section 303 and address code section 304 is a pattern with a duty ratio of 50%, in which the logic value of the magnetic region 307 is "1", and that of the non-magnetic region 308 is "0". The patterns 303 and 304 are similar to those acquired by recording data using a standard servo track writer.

The synchronous pattern section 303 is used to fix the phase and frequency of a read channel to those of a read signal. Further, the address code section 304 contains cylinder information (a track address). In each of the synchronous pattern section 303 and address code section 304, the magnetic regions 307 occupy substantially 50% of the entire area.

Furthermore, in the embodiment, the positional-error detection servo patterns 305 and 306 are reverse burst patterns using negative marks (non-magnetic marks). The positional-error detection servo patterns 305 and 306 are each formed of a so-called checkered pattern in which the magnetic polarity is repeated by 180 degrees displaced. The patterns 305 and 306 provide null servo patterns.

Specifically, the positional-error detection servo pattern 306 is acquired by radially displacing the phase of the positional-error detection servo pattern 305 by 90 degrees. The regions 305 and 306 are used to detect the deviated position of the head relative to the center of a target track.

A continuous magnetic region 301 is interposed between the servo region 300 and the data region 302. The continuous magnetic region 301 is effective as a magnetic recording region, like the magnetic regions 307 of the data region 302.

As described above, in the disk medium 1 of the DTR structure according to the embodiment, null servo patterns are formed as the positional-error detection servo patterns 305 and 306. Accordingly, in the servo region 300, the magnetic regions 307 in the positional-error detection servo patterns 305 and 306 can be set to substantially 50% of the entire area.

As a result, when servo data is embedded into the servo region 300 by a transfer forming method, stable transfer forming can be performed with the entire surface of the disk medium 1 kept under a uniform pressure. This leads to uniform forming of the positional-error detection servo patterns 305 and 306, and hence to highly accurate servo patterns.

Specifically, in the synchronous pattern section 303 and address code section 304, the magnetic regions 307 occupy substantially 50% of the entire area, and the magnetic regions 307 can be made to occupy substantially 50% of the entire area of the positional-error detection servo patterns 305 and 306. As a result, stable transfer forming can be realized, thereby providing highly accurate servo patterns.

Note that if a standard burst-type servo pattern is formed as a positional-error detection servo pattern in the servo region 300, the magnetic regions occupy about 75% of the area of the servo pattern, which is higher than the area percentage (50%) of the magnetic regions in the synchronous pattern section 303 and address code section 304. Further, the magnetic regions 307 included in the tracks of the data region 302 occupy about 66.6% of the entire area of the tracks.

Thus, when transfer forming is performed to embed standard burst servo patterns into the servo regions 300, differences occur in the entire area of the magnetic regions between the servo regions, which makes it difficult to perform stable pattern-transfer forming over the entire surface (all tracks/all sectors) of the disk medium 1. As a result, the positional-error detection servo patterns are not uniform, which inevitably degrades the accuracy of the patterns.

(Process for Manufacturing Disk Medium)

A process for manufacturing the disk medium 1 will now be described briefly.

The manufacturing process is roughly divided into a transfer process, a magnetism-changing process, and a polishing process. Firstly, a description will be given of a process for manufacturing a stamper as a base pattern for use in the transfer process.

The stamper-manufacturing process is subdivided into drawing, developing, electro-casting and polishing. In pattern drawing, portions of a disk medium, which are located between the inner periphery to the outer periphery and converted into non-magnetized portions, are drawn by exposure on a resist-coated original disk, using an original-disk-rotation type electro-beam exposure apparatus.

Subsequently, the resultant structure is subjected to, for example, RIE, thereby forming an original disk with an irregular pattern. This original disk is subjected to an electric conduction process, thereby electro-plating nickel (Ni) on the surface of the disk, and imparting the inner and outer diameters to the disk by punching. As a result, an Ni disk stamper is formed. In the stamper, the portions to be converted into non-magnetized portions are formed as projections. Using this stamper, a patterned medium is produced.

In the transfer process, transfer is performed by in-print lithography using a double-side transfer type in-printing apparatus. More specifically, disks coated with an SOG resist are attached to the opposite surfaces of a vertical recording disk by chucking with the inner peripheral hole thereof. In this state, two types of stampers prepared for both surfaces are made to hold the entire resist surfaces of the two disks with the same pressure, thereby transferring irregularities onto the resist surfaces. Resulting from this transfer process, the portions to be made non-magnetic are formed as depressions in the resist.

Thereafter, in the magnetism-changing process, the depressed resist portions are removed to expose the magnetic material surfaces of the portions to be made non-magnetic. In this state, at the portions at which a magnetic layer should be left, projections of silicon dioxide ($SiO_2$) are formed. After that, ion milling is performed using the $SiO_2$ layers as guard layers, thereby eliminating the magnetic layers located at the depressions. As a result, a desired magnetic material pattern is formed.

Further, sputtering is performed to make $SiO_2$ to a sufficient thickness to thereby eliminate irregularities. The resultant structure is subjected to reverse sputtering to expose the magnetic material surfaces, whereby a flat patterned medium is acquired which has depressions with a non-magnetic material embedded therein.

In the last polishing process, the flat surface is further subjected to polishing to thereby form a DLC protection layer. The resultant structure is coated with a lubricant, thereby providing the disk medium 1 of the embodiment.

(Structure of Disk Drive)

Figure 6:
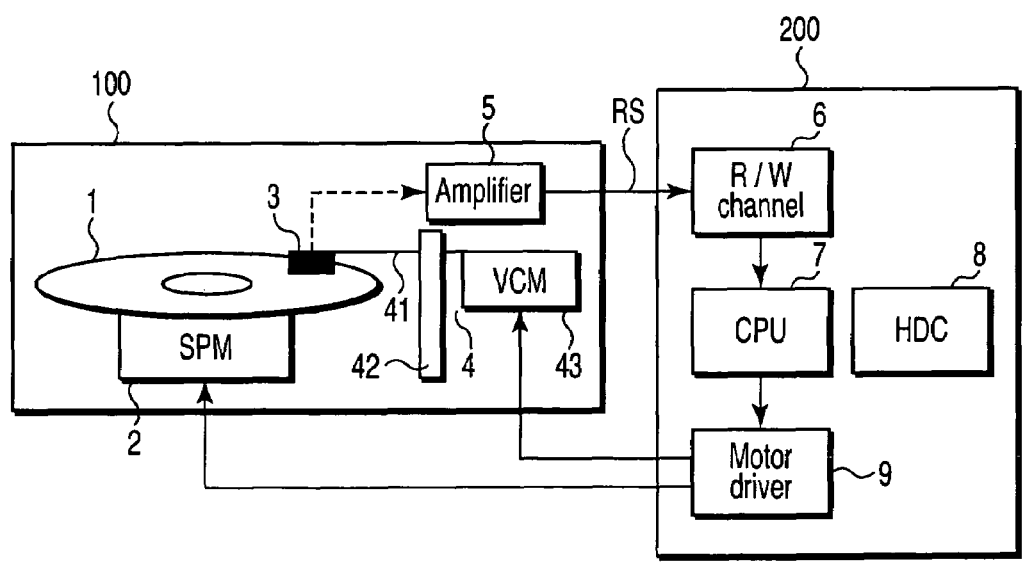
FIG. 6 is a block diagram illustrating the configuration of a disk drive according to the embodiment.

As shown in FIG. 6, the disk drive of the embodiment comprises a head disk assembly (HAD) 100 that includes the disk medium 1, spindle motor (SPM) 2, heads 3, actuator 4 and head amplifier IC 6, and a printed circuit board (PCB) 200.

As described above, the disk medium 1 is a patterned medium of a double-layered structure that has its both sides processed for DTR and can perform perpendicular magnetic recording. The heads 3 each comprise a read head (e.g. a GMR element) 30 and write head (e.g. a mono magnetic pole head) 31 mounted on the same slider (ABS), and are provided for the respective surfaces of the disk medium 1. Namely, the heads 3 are provided as a down-head and up-head for the upper and lower surfaces of the disk medium 1, respectively.

In the HAD (head disk assembly) 100, the disk medium 1 is attached to and rotated by the spindle motor 2. The actuator 4 is a movement mechanism for the heads, and comprises suspension arms 41 supporting the respective heads 3, a pivot shaft 42 supporting the arms 41 so that the arms can rotate, and a voice coil motor (VCM) 43. The VCM 43 imparts a torque to each arm 41 so that each arm 41 rotates about the pivot shaft 42, thereby radially moving each head 3 over the disk medium 1.

The head amplifier IC 5 is a driver for amplifying a signal input to or output from each head 3, and is electrically connected to the PCB 200 via a flexible cable (FPC). To reduce the SN ratio of the input/output signal of each head 3, it is preferable to mount, on the respective arms 41, head amplifiers IC 5 in the form of chips. However, a single head amplifier IC unit may be fixed to the drive main unit.

As mentioned above, the disk medium 1 has two surfaces. The disk medium 1 is mounted in a direction in which the head movement locus substantially coincides with the arc of the servo pattern of the servo region 300. The specifications of the disk medium 1 are basically the same as those of a standard disk medium for, for example, vertical magnetic recording. However, the center of the arc of the servo region 300 is situated on the circumference of a circle using, as a radius thereof, the distance between the center of rotation of the disk and the center of pivoting of the pivot shaft 42. Further, the distance between the pivot shaft 42 and each head 3 is used as the radius of the arc.

The PCB 200 is mainly provided with four system LSIs. Namely, the read/write (R/W) channel IC 6, microprocessor (CPU) 7, disk controller (HDC) 8 and motor driver IC 9.

The CPU 7 is a main controller for the disk drive, and provides a head-positioning control system in the embodiment. Assume here that the CPU 7 includes a ROM storing software for operations (e.g. control programs), a RAM used as a work memory, and a logic circuit. The logic circuit is a computation unit formed of a hardware circuit.

The HDC (disk controller) 8, for instance, serves as an interface between the disk drive and a host system (e.g. a personal computer), controls data transfer to the read/write channel IC 6, and exchanges information with the motor driver IC 9.

The read/write channel IC 6 is a unit for processing a read/write signal related to a read/write operation, and includes various circuits for switching the channel of the head amplifier IC 5, and for recording/reproducing servo data and user data.

The motor driver IC 9 controls the SPM 2 and VCM 43 controls the SPM 2 and VCM 43. Specifically, the driver IC 9 controls the rotation of the SPM 2, and supplies the VCM 43 with a current corresponding to the amount of control designated by the CPU 7.

(Read/Write Channel IC)

Figure 7:
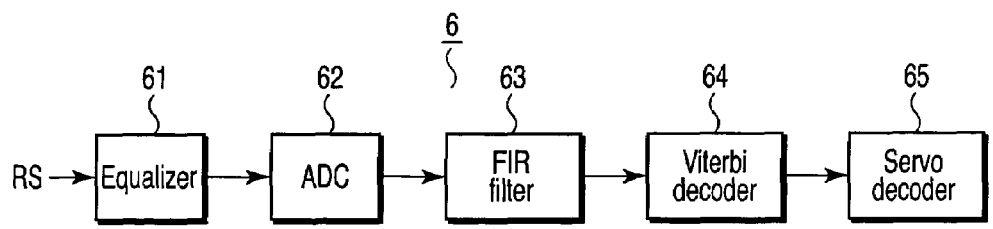
FIG. 7 is a block diagram illustrating essential parts of a read/write channel incorporated in the embodiment.

As shown in FIG. 7, the read/write channel IC 6 comprises an equalizer 61, A/D converter 62, digital filter (digital FIR filter) 63, Viterbi decoder 64 and servo decoder 65.

The equalizer 61 receives a read signal RS from the head amplifier IC 5, and performs analog filtering. The read signal RS is read from, for example, the servo region by the read head 30.

The A/D converter 62 performs sampling of the read signal equalized by the equalizer 61, and outputs a digital signal corresponding to the read signal to the FIR 63.

The leakage field from the disk medium 1 of the embodiment is of vertical magnetization, and has a pattern in which the magnetic regions 307 and non-magnetic regions 308 are mixed. In the read/write channel IC 6, the read signal has its DC offset component completely eliminated by the high-pass characteristic of the head amplifier IC 5 and the equalization by the equalizer 61. As a result, the read signal is a substantially sine wave signal. In the disk medium 1 of the embodiment, the amplitude of the read signal is reduced by half, compared to a standard disk medium for vertical magnetic recording.

Although this does not occur only in such a patterned medium as the disk medium 1 of the embodiment, the channel IC 6 may fail in code detection as a result of misidentification of "1" as "0" or vice versa, depending upon misidentification of the direction of the leakage flux of the servo region 300. In light of this, it is necessary to appropriately set the head polarity in accordance with the pattern leakage flux.

The channel IC 6 switches the processes in accordance with the phase of a reproduction signal. It performs, for example, a synchronization process for synchronizing a reproduction signal clock with the pattern cycle of the disk medium 1, an address determination process for reading sector cylinder code information, and processing of the servo patterns 305 and 306 to detect off-track amounts.

The A/D converter 62 synchronizes the sampling timing of digital values with the read signal of a sine wave, and performs AGC processing for setting the amplitudes of signal components corresponding to sampled digital values. The A/D converter 62 samples the cycles of "1" or "0" at four points.

In the reproduction process of the address information 304 in the servo region 300, the channel IC 6 reduces the noise level of each digital sampling value using the FIR 63, and performs Viterbi decoding based on likelihood estimation by the Viterbi decoder 64. Based on the detection result of the Viterbi decoder 64, the servo decoder 65 performs gray-code reverse transform, thereby generating sector and track (cylinder) information. As a result, the CPU 7 acquires servo track information (track position information) necessary for the positioning of each head 3.

The channel IC 6 now shifts to the process of detecting off-track amounts in the servo patterns 305 and 306. Firstly, the channel IC 6 performs sample/hold integration on the amplitudes of servo burst signal patterns in the order of servo burst signal patterns A, B, C and D. After that, the channel IC 6 supplies the CPU 7 with a voltage value corresponding to the average amplitude, and generates a servo processing interruption signal to the CPU 7. Upon receiving the interruption signal, the CPU 7 reads burst signal components in a time-series manner using an A/D converter contained therein, and performs conversion to off-track amounts using a digital signal processor (DSP) included in the logic circuit. Based on the off-track amounts and servo track information, the CPU 7 accurately detects the servo track position of each head.

(Head-positioning Control System)

Figure 8:
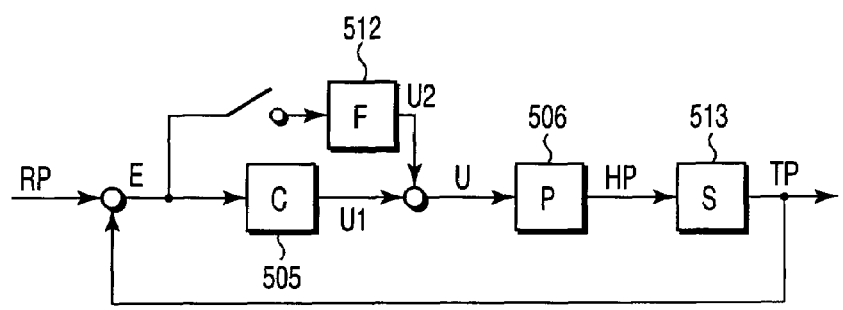
FIG. 8 is a block diagram illustrating the configuration of a head positioning control system incorporated in the embodiment.
Figure 9:
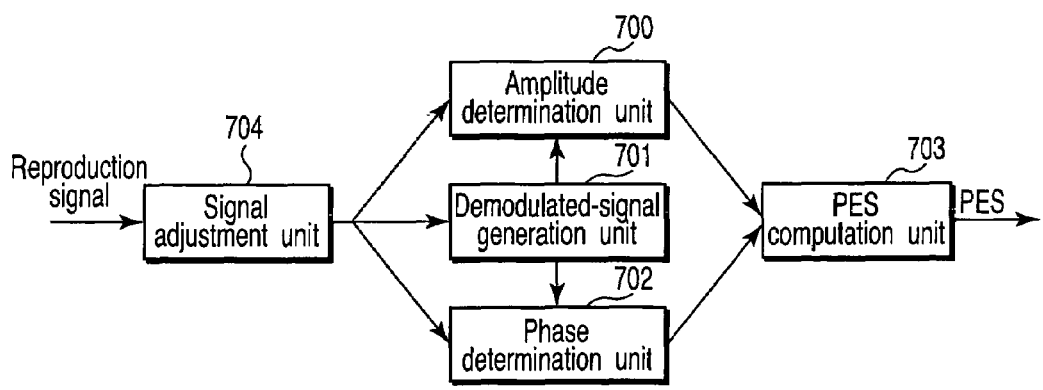
FIG. 9 is a block diagram useful in explaining a positional-error detection system incorporated in the embodiment.

The disk drive incorporates such a head-positioning control system as shown in FIG. 8. The head-positioning control system is realized by the CPU 7 and software and read/write channel IC 6. Referring to FIGS. 8 and 9, the head-positioning control system will be described briefly.

In FIG. 8, reference symbols C, F, P and S denote the transmission functions of respective system elements. A control target plant (P) 506 corresponds to the VCM 43 in a narrow sense, and to the actuator 4 including the VCM 43 in a broad sense. A signal-processing unit (S) 513 is specifically realized by the read/write channel IC 6 and CPU 7 (which performs part of the off-track amount detection process). A feedback controller (hereinafter referred to as "the first controller") 505 and synchronization suppression compensation unit (hereinafter referred to as "the second controller") 512 are specifically realized by the CPU 7 and software.

The signal-processing unit 513 generates information indicating the present track position (TP) on the disk medium 1, based on a servo reproduction signal including, for example, address information from the servo region 300 just below the position (HP) of the head 3 corresponding to the movement of the plant 506.

The first controller 505 calculates FB operation value U1 to eliminate the positional error (E) between the target track position (RP) on the disk medium 1 and the present position (TP) of the head.

The second controller 512 is a feed forward (FF) compensation unit for compensating, for example, vibration synchronous with the configuration of each track on the disk medium 1, or synchronous with the rotation of the disk, and stores, in a memory table, rotation-synchronous compensation values calibrated beforehand. The second controller 512 does not normally use the positional error (E), and calculates a value corresponding to FF operation value U2 with reference to the memory table, based on servo sector information (not shown) supplied from the signal-processing unit 513.

The CPU 7 adds the outputs of U1 and U2 of the first and second controllers 506 and 512, and sends the addition result to the plant 506 as a control value U. Specifically, the HDC 8 supplies the VCM 43 with the control value U from the CPU 7 via the motor driver IC 9, thereby driving each head 3.

A synchronization-compensation-value table is calibrated during the initial operation. However, when the positional error (E) is not less than a set value, re-calibration processing is started to update the table.

Referring now to FIG. 9, a brief description will be given of how to detect the positional error using a reproduction signal output from the read head 30.

The disk medium 1 is rotated at a constant rotational speed by the SPM 2. The head 3 is elastically supported by the suspension arm 41 via a gimbal provided on the arm 41. At this time, the head 3 is designed so that it floats above the disk medium 1 with a slight clearance therebetween to be balanced with the pressure of air that occurs when the disk is rotated. As a result, the read head 30 can detect a leakage flux from the magnetic layer of the disk medium 1 with a constant magnetic clearance defined therebetween.

The record signal of the servo region 300 passes just below the head 3 at regular intervals in accordance with the rotation of the disk medium 1. The head-positioning control system can perform servo processing (positioning control) at regular intervals by detecting track position information in a reproduction signal output from the read head 30.

Once detecting an identification flag, called a servo mark, indicating the servo region 300, the HDC 8 can estimate the timing at which the servo region 300 passes just below the head 3, since the servo region 300 is detected at regular intervals. At the timing at which the preamble portion of the servo region 300 passes just below the head 3, the HDC 8 causes the channel IC 6 to start servo processing.

FIG. 9 is a block diagram illustrating the configuration of a positional-error detection system for processing positional-error detection servo patterns 305 and 306 of the servo region 300. This system receives a reproduction signal from the read head 30, and detects a positional error (PES) of the head 3 in a track. Specifically, the system is realized by the CPU 7 that includes the read/write channel IC 6 and logic circuit.

This system mainly comprises a signal adjustment unit 704 for adjusting a reproduction signal (by, for example, differentiation processing), an amplitude determination unit 700, a decoded-signal generation unit 701, a phase determination unit 702 and a PES computation unit 703.

The amplitude determination unit 700, decoded-signal generation unit 701 and phase determination unit 702 execute processing for detecting a positional error of the head 3, output a voltage value corresponding to the detected value to the CPU 7, and issue a servo-processing interruption signal. Upon receiving the servo-processing interruption signal, the CPU 7 performs processing for converting the detected value into an off-track amount, using the DSP corresponding to the PES computation unit 703.

(Processing of Reproduction Signal and Positional-error Detection Processing)

Referring to FIGS. 9 and 3A to 5C, a detailed description will be given of processing of reproduction signals read from the positional-error detection servo patterns 305 and 306 of the servo region 300, and the positional-error detection processing concerning the patterns.

FIGS. 3A to 5C show reproduction signals 400, 500 and 600 output from the read head 30 when the head 3 passes over the positional-error detection servo pattern 305 of the servo region 300, and differential signals 401, 501 and 601 of the reproduction signals.

FIG. 3A shows the case where the read head 30 passes over the positional-error detection servo pattern 305 between the centerlines of tracks Trk1 and Trk2. When the read head 30 passes from the left to the right in the figure, it detects a change in magnetic force between the magnetic region 307 and the non-magnetic region 308. As a result, as sown in FIG. 3B, the read head 30 outputs the reproduction signal 400.

The read/write channel IC 6 performs differential equalization processing on the reproduction signal 400, thereby generating the differential signal 401 suitable for signal processing, as shown in FIG. 3C.

FIG. 4A shows the case where the read head 30 passes over the positional-error detection servo pattern 305 between the centerlines of tracks Trk2 and Trk3. When the read head 30 passes from the left to the right in the figure, it detects a change in magnetic force between the magnetic region 307 and the non-magnetic region 308. As a result, as sown in FIG. 4B, the read head 30 outputs the reproduction signal 500.

The read/write channel IC 6 performs differential equalization processing on the reproduction signal 500, thereby generating the differential signal 501 suitable for signal processing, as shown in FIG. 4C.

The reproduction signal 500 is deviated in phase by 180 degrees from the reproduction signal 400. Accordingly, based on whether the phase is deviated in the "+" or "−" direction, the CPU 7 can determine in which direction the read head 30 is moved from the center of the track.

Figure 5A:
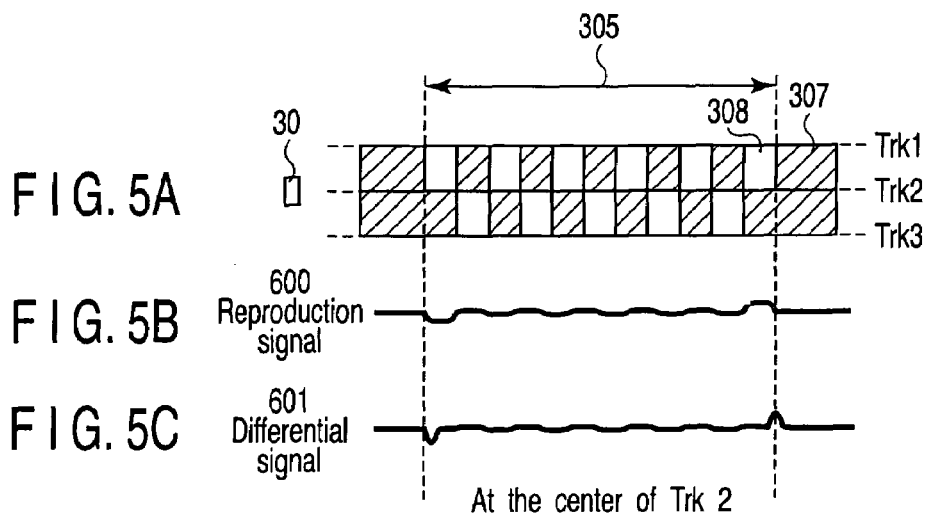

Furthermore, FIG. 5A shows the case where the read head 30 passes over the positional-error detection servo pattern 305 at the centerline of track Trk2. When the read head 30 passes from the left to the right in the figure, it detects a change in magnetic force between the magnetic region 307 and the non-magnetic region 308. As a result, as sown in FIG. 5B, the read head 30 outputs the reproduction signal 600 that has an amplitude of substantially zero. Accordingly, the amplitude of the differential signal 601 generated by the read/write channel IC 6 is also substantially zero as shown in FIG. 5C.

As described above, when the read head 30 passes over the positional-error detection servo pattern 305, the amplitude and phase of a reproduction signal generated by the head 30 indicate the amount and direction of head offset, respectively. In the embodiment, the positional-error detection servo pattern 305 (306) is a null-type servo pattern.

When the read head 30 is positioned above the centerline of a target track, the amplitude of the reproduction signal is ideally zero. When the head 30 is away from the target track, the amplitude of the reproduction signal is increased. Further, when the head 30 is positioned at the middle point of the centerlines of the target track and an adjacent track, the amplitude of the reproduction signal is maximum. The pattern at one side of a track centerline is deviated in phase by 180 degrees from the pattern at the other side of the track centerline. Thus, the phase of the reproduction signal indicates the direction of deviation of the head 30 from the track centerline.

Also concerning the positional-error detection servo pattern 306, a reproduction signal corresponding to the position of the read head 30 can be acquired in the same manner as the above. From the servo pattern 306, however, positional-error detection information indicating a positional error deviated in phase by 90 degrees from that acquired from the servo pattern 305 is acquired.

Referring then to FIG. 9, a description will be given of the process of demodulating the positional-error detection servo pattern 305 using the positional-error detection system, thereby generating positional error information PES.

The signal adjustment unit 704 performs differential equalization processing as pre-processing for the reproduction signals 400, 500 and 600, and outputs the aforementioned differential signals 401, 501 and 601. The demodulated-signal generation unit 701 generates a demodulated signal having the same phase and frequency as the base component of each reproduction signal.

The amplitude determination unit 700 determines the amplitude of the reproduction signal corresponding to the positional error, based on the demodulated signal generated by the demodulated-signal generation unit 701, and outputs the determined amplitude. The phase determination unit 702 determines the phase of the reproduction signal corresponding to the positional error, based on the demodulated signal generated by the demodulated-signal generation unit 701, and outputs the determined phase.

Based on the determined amplitude and phase, the PES computation unit 703 computes the positional error value (positional-error detection information) of the read head 30 that outputs the reproduction signal. Further, using both the positional-error detection information items concerning the positional-error detection servo patterns 305 and 306, the PES computation unit 703 computes, from the difference in amplitude, an absolute positional error value with respect to the centerline of the target track, and computes the direction of movement from the difference in phase.

Furthermore, the PES computation unit 703 can acquire a positional error only using the amplitude determined by the amplitude determination unit 700. Specifically, the PES computation unit 703 acquires positional errors posAB and posCD concerning the positional-error detection servo patterns 305 and 306, respectively, and computes, from the difference therebetween, the positional error with respect to the track center.

As described above, in the embodiment, the positional-error detection servo patterns 305 and 306 of the servo region 300 are formed of null-type servo patterns. This enables the magnetic regions included in the servo region 300 to occupy substantially 50% of the area of the servo region. Accordingly, the percentage of the magnetic regions is prevented from differing between the preamble portion and the servo pattern portion in the servo region 300.

This being so, the servo data transfer forming process in the patterned-medium manufacturing process can be made simple, which enables a stable servo pattern signal to be acquired. As a result, the positional error of the read head 30 in a target track can be accurately measured, whereby highly accurate head-positioning control can be realized in the disk drive using the disk medium 1 of the DTR structure.

As described above, in the disk medium of the embodiment, the positional-error detection servo patterns of the servo region are formed of null-type servo patterns, which enables stable transfer forming to be utilized to embed the servo patterns in the servo region. As a result, the servo patterns can be made uniform and highly accurate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk medium used as a recording medium in a disk drive and including circumferentially extending tracks, comprising:
    a data region formed over the tracks and including non-magnetic guard bands which isolate each pair of adjacent ones of the tracks; and a servo region with servo data recorded therein, the servo region including a servo pattern which is formed of first regions effective as magnetic regions, and second regions ineffective as magnetic regions, the servo pattern including a null servo pattern used to detect a positional error in each track.

2. The magnetic disk medium according to claim 1, wherein vertical magnetic recording can be performed in the data region and the servo region.

3. The magnetic disk medium according to claim 1, wherein the first regions occupy substantially 50% of an area of the servo region.

4. The magnetic disk medium according to claim 2, wherein the first regions occupy substantially 50% of an area of the servo region.

5. The magnetic disk medium according to claim 1, wherein the servo region at least includes a synchronization pattern section and an address pattern section, and the null servo pattern is interposed between the address pattern section and the data region, and has positional-error detection pattern sections, phases of the positional-error detection pattern sections being radially displaced by 90 degrees.

6. The magnetic disk medium according to claim 3, wherein the servo region at least includes a synchronization pattern section and an address pattern section, and the null servo pattern is interposed between the address pattern section and the data region, and has positional-error detection pattern sections, phases of the positional-error detection pattern sections being radially displaced by 90 degrees.

7. The magnetic disk medium according to claim 1, further comprising a continuous magnetic region interposed between the servo region and the data region.

8. The magnetic disk medium according to claim 3, further comprising a continuous magnetic region interposed between the servo region and the data region.

9. The magnetic disk medium according to claim 5, further comprising a continuous magnetic region interposed between the servo region and the data region.

10. The magnetic disk medium according to claim 1, wherein the servo region is formed like an arc which coincides with a locus of a head incorporated in the disk drive, and a length of the servo pattern in a circumferential direction is varied along a radius of the magnetic disk medium.

11. A disk drive comprising:
a magnetic disk medium provided with circumferentially extending tracks including a data region formed over the tracks and a servo region with servo data recorded therein, the data region including non-magnetic guard bands which isolate each pair of adjacent ones of the tracks, the servo region including a servo pattern which is formed of first regions effective as magnetic regions, and second regions ineffective as magnetic regions, the servo pattern including a null servo pattern used to detect a positional error in each track;
a head which records and reproduces data to and from the magnetic disk medium; and
a controller which performs positioning control of the head based on a servo pattern read by the head from the servo region.

12. The disk drive according to claim 11, wherein vertical magnetic recording can be performed on the magnetic disk medium, and the head includes a write head capable of vertical magnetic recording.

13. The disk drive according to claim 11, wherein the first regions occupy substantially 50% of an area of the servo region of the magnetic disk medium.

14. The disk drive according to claim 11, wherein the servo region of the magnetic disk medium at least includes a synchronization pattern section and an address pattern section, and the null servo pattern of the magnetic disk medium is interposed between the address pattern section and the data region, and has positional-error detection pattern sections, phases of the positional-error detection pattern sections being radially displaced by 90 degrees.

15. The disk drive according to claim 11, wherein the magnetic disk medium further includes a continuous magnetic region interposed between the servo region and the data region.

* * * * *